United States Patent [19]
Hillegonds

[11] Patent Number: 5,799,906
[45] Date of Patent: Sep. 1, 1998

[54] CABLE MOUNT AND FIXTURE

[76] Inventor: Larry A. Hillegonds, 2504 Riivendell, New Lenox, Ill. 60451

[21] Appl. No.: 661,837

[22] Filed: Jun. 11, 1996

Related U.S. Application Data

[60] Continuation of Ser. No. 345,163, Nov. 28, 1994, abandoned, which is a division of Ser. No. 148,172, Nov. 1, 1993, Pat. No. 5,368,261, which is a continuation-in-part of Ser. No. 991,820, Dec. 17, 1992, abandoned.

[51] Int. Cl.$^6$ ............................................. F16G 11/00
[52] U.S. Cl. ........................ 248/49; 248/65; 248/69; 269/903
[58] Field of Search ..................... 269/903; 29/235, 29/281.1, 450; 248/65, 49, 677, 68.1, 69, 73, 74.1, 74.3

[56] References Cited

U.S. PATENT DOCUMENTS

| | | | |
|---|---|---|---|
| 1,210,701 | 1/1917 | Ryden | 248/74.1 |
| 2,938,692 | 5/1960 | Bosworth et al. | 248/68.1 |
| 3,154,281 | 10/1964 | Frank. | |
| 3,210,030 | 10/1965 | Ramsey et al. | |
| 3,258,039 | 6/1966 | Ewalt. | |
| 3,632,070 | 1/1972 | Thayer | 248/68.1 |
| 3,883,929 | 5/1975 | Fortsch. | |
| 3,905,570 | 9/1975 | Nieuwveld. | |
| 4,009,852 | 3/1977 | Bulanda. | |
| 4,029,277 | 6/1977 | Bulanda. | |
| 4,341,367 | 7/1982 | Wieland | 248/68.1 |
| 4,371,137 | 2/1983 | Anscher. | |
| 4,943,183 | 7/1990 | Nakano | 248/74.3 X |
| 5,222,701 | 6/1993 | Rowland | 248/74.3 |
| 5,354,021 | 10/1994 | Farrell | 248/74.3 |

OTHER PUBLICATIONS

Western Electric Technical Digest No. 26 pp. 33–34, Apr. 1972.

*Primary Examiner*—Derek J. Berger
*Attorney, Agent, or Firm*—Mark D. Hilliard; Robert A. McCann

[57] ABSTRACT

A cable mount for securing a bundle of wires against a mounting surface including a spaced apart pair of legs having retention barbs, and a corresponding harness fixture, which allows for easy application of a single, centered cable tie by an automatic cable tie application tool.

8 Claims, 4 Drawing Sheets

CABLE MOUNT AND FIXTURE

This is a continuation of application Ser. No. 08/345,163, filed Nov. 28, 1997 now abandoned, which is division of application Ser. No. 148,172, filed Nov. 1, 1993, U.S. Pat. No. 5,368,261 which is a Continuation-in-Part of application Ser. No. 07/991,820, filed Dec. 17, 1992, now abandoned.

TECHNICAL FIELD

The present invention relates to a cable mount and accompanying fixture, and more specifically to a cable mount which can be secured to a bundle of wires by application of a single cable tie, preferably by an automatic tool, and a fixture for supporting the cable mount during application of the cable tie.

BACKGROUND OF THE INVENTION

There are a wide variety of fasteners and mounts that have been proposed to secure a bundle of wires to a mounting surface. Many of these utilized today, have general features similar to one of the types disclosed in the following commonly assigned U.S. Pat. Nos. 4,919,373, 4,805,856, 3,632,071 and 3,632,069. While each of these types of cable tie mounts possess certain desirable characteristics, they also fail to possess certain desirable characteristics. One major desirable feature that is lacking in all of these types of cable mounts is their inaccessibility to automatic cable tie application systems and tools. It is often desirable to have the ability to use automatic cable tie application tools when using cable mounts, particularly when utilizing a harness board set up. In order for the cable tie mount to be useful, the automatic cable tie application tool must be able to tighten the cable tie around both the bundle of wires and have the tie also be secured to the mount. Furthermore, the mount must be strong enough to secure the bundle to the mounting surface as well as to not collapse under the stresses applied by the automatic cable tie application tool. It is also important to have the bundle balanced on the mount in order to ensure that the mount will be properly secured to the structure.

SUMMARY OF THE INVENTION

It is therefore an object of the present invention to provide a cable tie mount which can be used in conjunction with automatic cable tie application tools.

It is another object of the present invention to provide a cable tie mount that has a pair of spaced apart mount legs between which an automatic cable tie application tool can secure the bundle by application of a single cable tie.

It is a further object of the present invention to provide a cable mount that can hold a bundle of wires by a single centered cable tie.

It is still a further object of the present invention to provide a fixture for supporting the cable mount against a wall, such as a harness board, in such a manner so as to allow application of a single, centered cable tie by an automatic cable tie installation tool.

In general, a cable mount for mounting a bundle of wires to a mounting surface includes a resilient body member resiliently deformable from a first to a second position, and first and second mounting legs formed on and projecting from the body member such that deformation of the body member to the second position spaces the first and second legs further apart.

DESCRIPTION OF THE PREFERRED EMBODIMENTS

Figure 1:
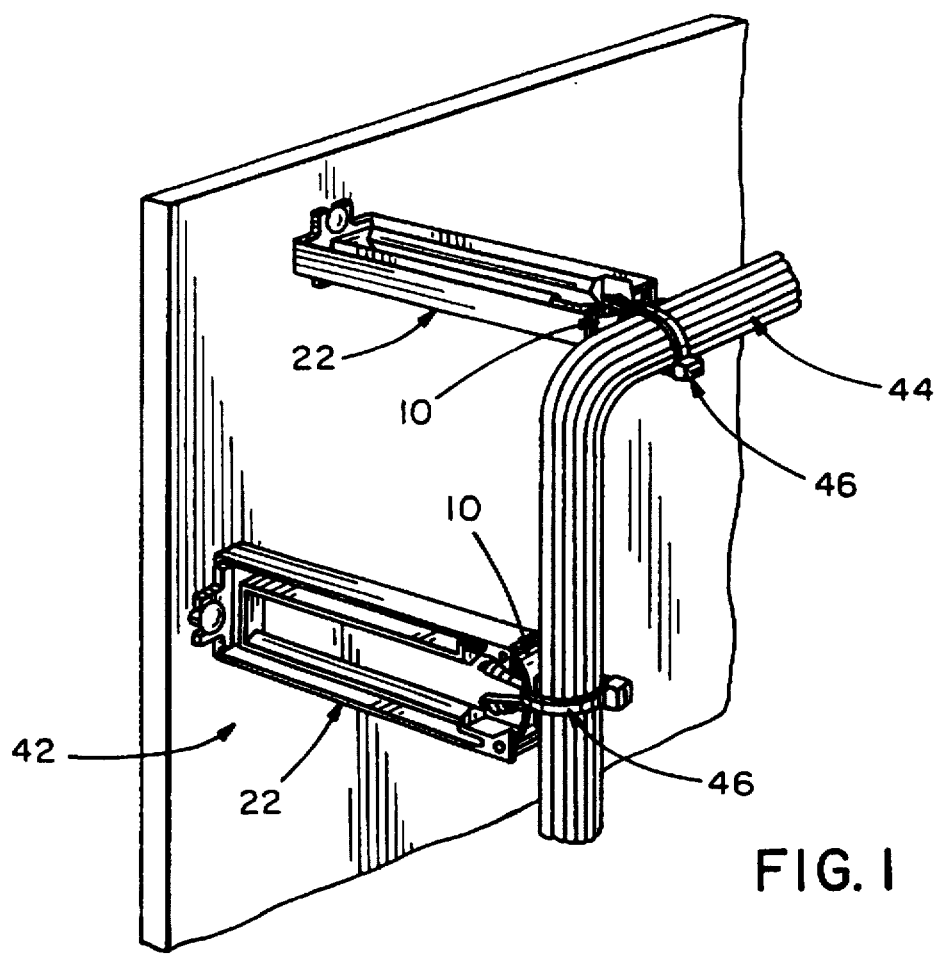
FIG. 1 is a partial perspective view of a harness board set up utilizing cable mounts and fixtures embodying the concept of the present invention.
Figure 2:
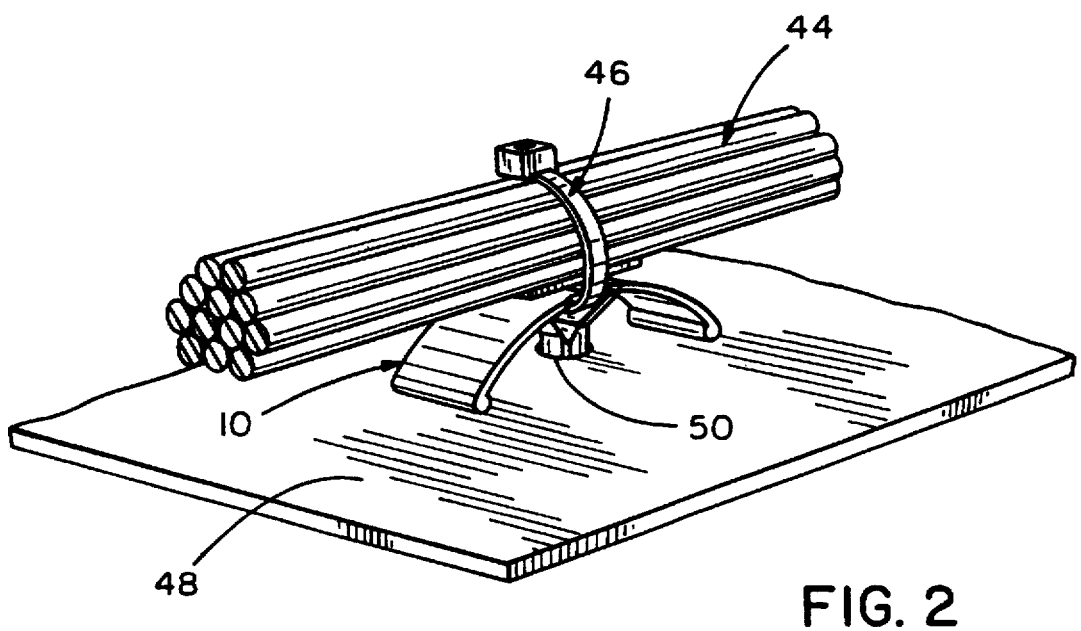
FIG. 2 is a partial perspective view of a cable mount embodying the concept of the present invention shown secured to a bundle by a cable tie and mounted on a surface.
Figure 3:
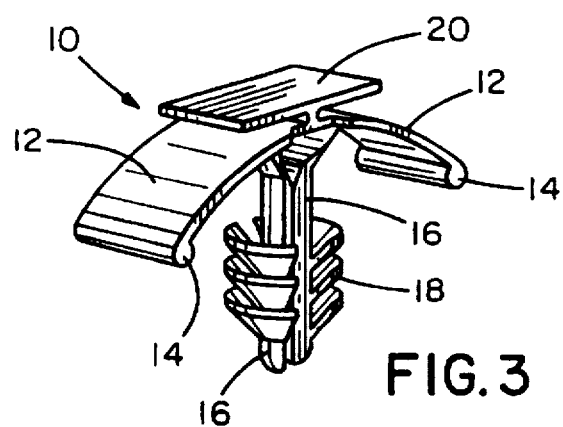
FIG. 3 is a perspective view of the cable mount embodying the concept of the present invention.
Figure 4:
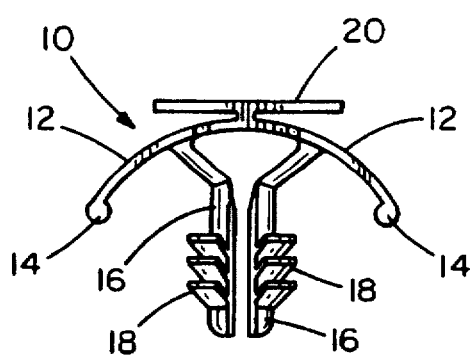
FIG. 4 is a side view of the cable mount of FIG. 3.
Figure 5:
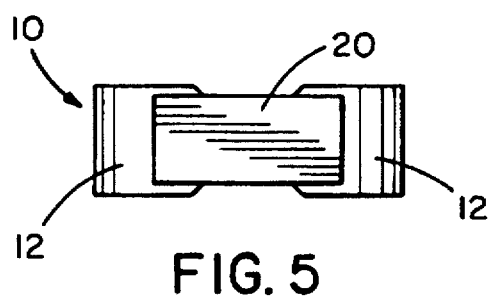
FIG. 5 is a top view of the cable mount of FIG. 3.
Figure 6:
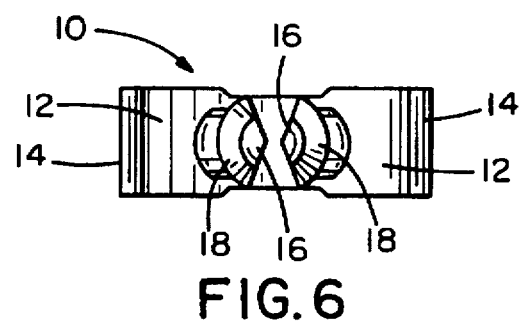
FIG. 6 is a bottom view of the cable mount of FIG. 3.

A cable mount embodying the concept of the present invention is designated generally by the reference numeral 10 in the accompanying drawings. Cable mount 10 includes a resilient arcuate body member that is composed of a pair of oppositely extending integral tension arms 12, and a pair of spaced apart legs 16 that extend radially inward from the concave underside of tension arms 12. Each tension arm 12 is resilient and includes a flanged end 14 which is cylindrically shaped. As can be seen in FIG. 4, each leg 16 extends from the underside of one of the tension arms 12 and is initially directed radially inward towards each other. Legs 16 are equidistant from a centerpoint on the arcuate body member and are further shaped to include bends whereby they remain spaced apart, yet become parallel to each other. As also can be seen in FIG. 4, there is a greater distance between legs 16 near the tension arms 12 than below the bend in legs 16. This resulting space is sufficiently large for a cable tie to be inserted in between legs 16. Legs 16 also include a plurality of retention barbs 18 formed as semi-circular, upwardly angled, disc protrusions on the non-opposing sides of legs 16. There is also included a saddle support 20, as seen in FIGS. 3 and 4, attached to the top of tension arms 12 at their centerpoint, which provides a flat surface for the bundle of wires 44 to rest upon, as well as reducing the stress placed on tension arms 12.

Figure 7:
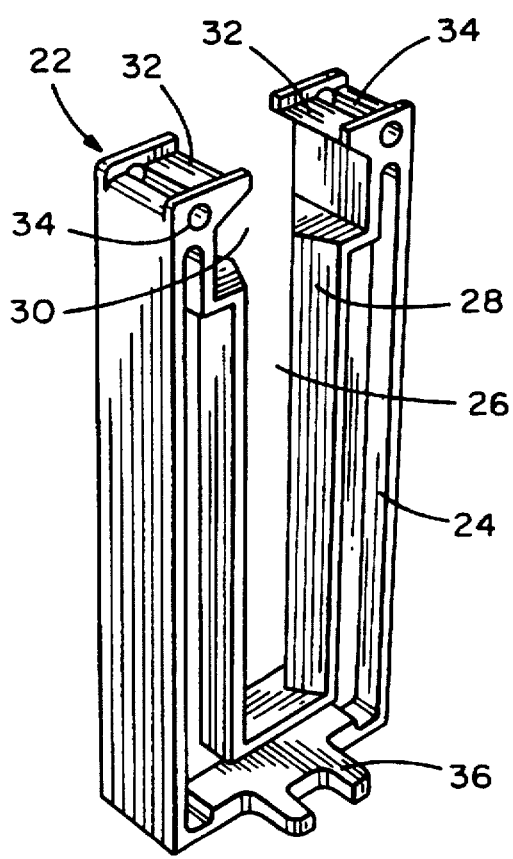
FIG. 7 is a perspective view of a fixture embodying the concept of the present invention.
Figure 8:
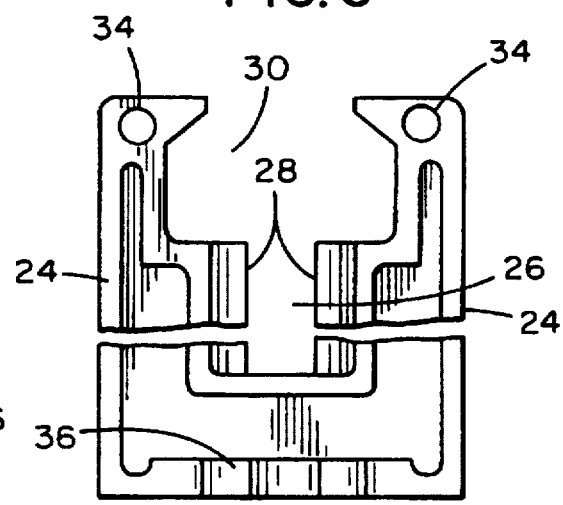
FIG. 8 is a fragmentary side view of the fixture of FIG. 7.
Figure 9:
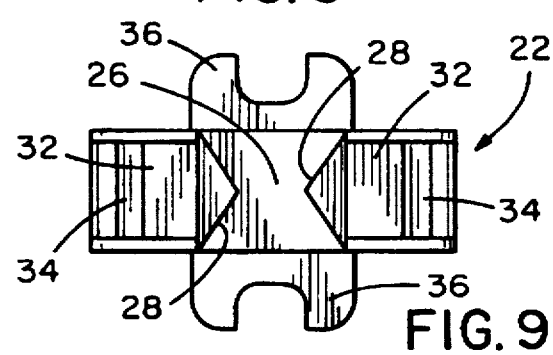
FIG. 9 is a top view of the fixture of FIG. 7.
Figure 11:
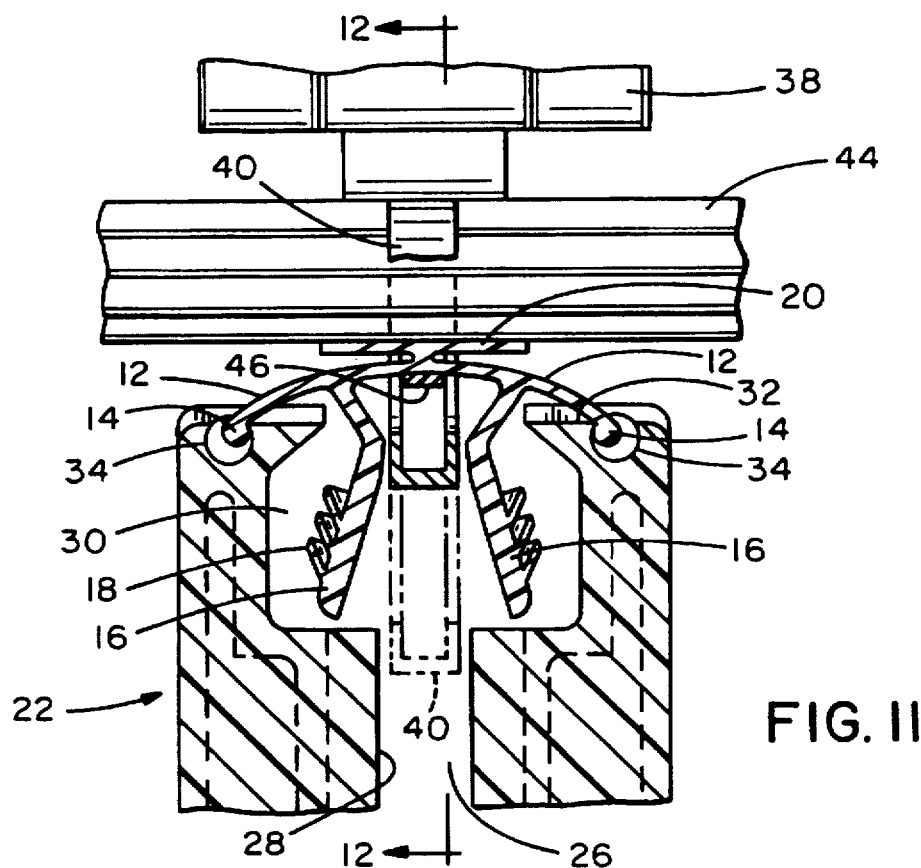
FIG. 11 is a side view of the cable mount and fixture having the cable tie applied by an automatic tool.
Figure 12:
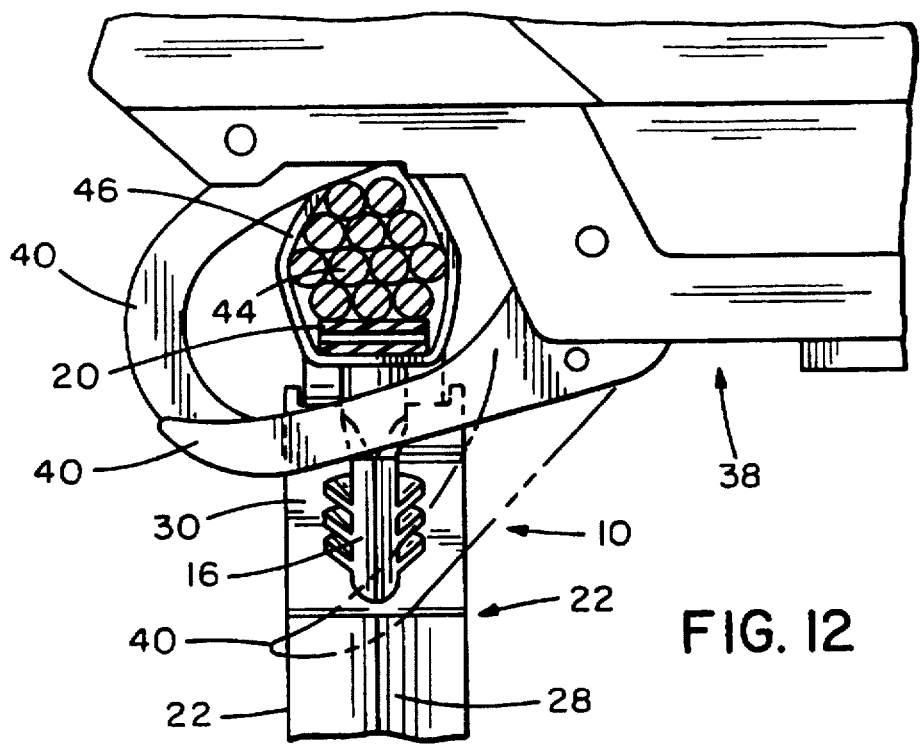
FIG. 12 is a sectional view of the cable mount and fixture having the cable tie applied by the automatic tool, taken along line 12—12 of FIG. 11.

Harness fixture 22, as seen in FIG. 7, includes a base and a pair of spaced apart vertical fixture arms 24 attached to the base, having horizontally planar top guide surfaces 32 at their distal ends. Each top guide surface 32 cooperates with a cylindrical retention hole 34 for engagement with flanged ends 14 of the respective tension arms 12 of cable mount 10. Each fixture arm 24 of harness fixture 22 has a pair of converging central guide surfaces 28 that lead the jaws 40 of an automatic cable tie application tool 38 into a central gap 26 that is created between the spaced apart fixture arms 24. There is a further indented upper gap 30 near the distal ends of fixture arms 24. This upper gap 30 allows for legs 16 of cable mount 10 to spread as they engage with harness fixture 22, which allows for a cable tie 46 to be applied between legs 16 and around cable mount 10 as seen in FIG. 11. The base of harness fixture 22 includes mounting means for securing harness fixture 22 to a harness board such as transversely extending guide slots 36, shown in FIGS. 7 and 9, or a threaded aperture in the base (not shown).

Figure 10:
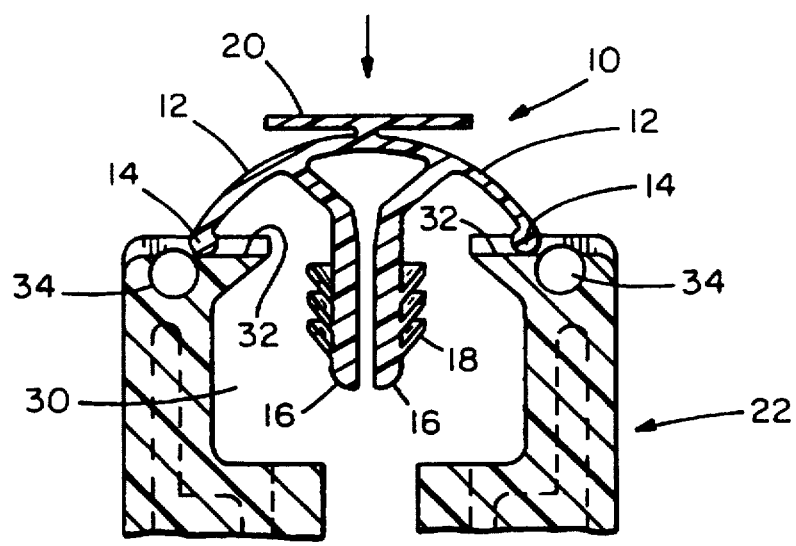
FIG. 10 is a side sectional view of the cable mount and fixture prior to engaging the cable mount to the fixture.

As can be seen in FIG. 10, just prior to engagement with harness fixture 22 the body member of cable mount 10 is in a first non-deformed position and the main portion of legs 16 of cable mount 10 are parallel to each other. When cable mount 10 is pushed into engagement with harness fixture 22, the body member deforms to a second position and tension arms 12 spread out until flanged ends 14 come into engagement with retention pockets 34 to secure cable mount 10 to harness fixture 22. As can be seen in FIG. 11, as tension arms 12 spread out the integrally attached legs 16 are also pulled apart into the extra space of upper indented gap 30. This opening up of legs 16, which occurs when the body member is deformed to its second position, allows for tool jaws 40 of an automatic tool 38 to be inserted between legs 16 so that cable tie 46 can be applied around cable mount 10 and the bundle of wires 44. Central guide surfaces 28 also aid in the application of cable tie 46 around cable mount 10. As best seen in FIG. 11, central guide surfaces 28 direct the tool jaws 40 into central gap 26 so that the cable tie 46 can be applied in between spread legs 16 of cable mount 10.

After cable tie 46 has been applied around cable mount 10 and bundle 44, the mount 10 is removed from harness fixture 22 by rotating the flanged ends 14 out of engagement with retention pockets 34 and is then ready to be secured to a mounting surface 48.

Figure 13:
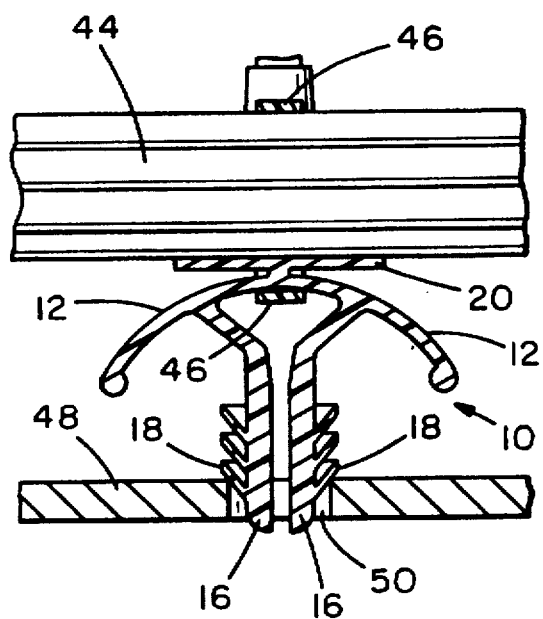
FIG. 13 is a sectional view of the cable mount partially inserted into a hole in a mounting surface.
Figure 14:
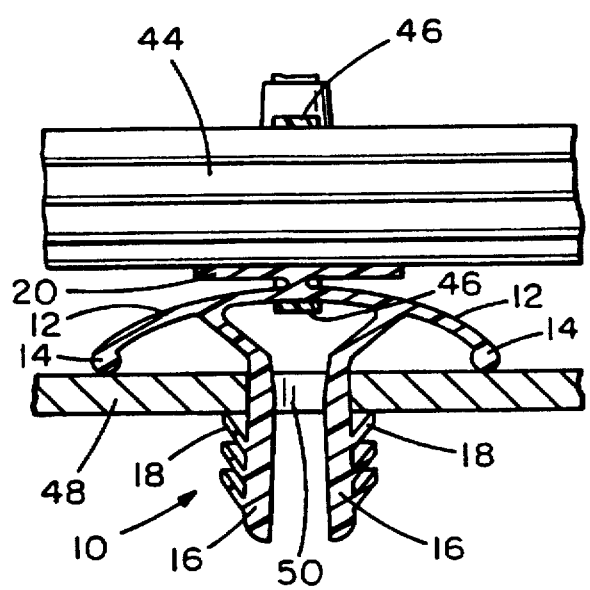
FIG. 14 is a sectional view of the cable mount fully inserted into the hole in the mounting surface.

As shown in FIGS. 13 and 14, cable mount 10 is mounted to mounting surface 48 by inserting legs 16 into a mounting hole 50 in the mounting surface 48 until retention barbs 18 are fully through mounting hole 50. Retention barbs 18 are reversely angled and shaped so that they will facilitate the insertion of legs 16 into mounting hole 50, and yet they will prevent the removal of cable mount 10 by abutting the opposing side of the mounting surface 48. Flanged ends 14 of tension arms 12 are pressed against mounting surface 48, and the pressure causes tension arms 12 to spread out slightly thus causing a slight spreading of legs 16 which further secures cable mount 10 to mounting surface 48.

While the particular embodiments of the present invention have been shown and described, it will be obvious to those skilled in the art that changes and modifications may be made without departing from the invention in its broader aspects. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A fixture for supporting a cable mount having a resilient body member formed as a pair of oppositely extending tension arms including flanged ends, resiliently deformable from a first to a second position, and first and second mounting legs formed on and projecting from the body member such that deformation of the body member to the second position spaces the first and second legs further apart comprising:

a base member having mounting means for mounting the fixture to a harness board;

a pair of spaced apart fixture arms, each formed on and projecting vertically from the base member to a substantially horizontally planar distal end surface, having engaging means for engaging the cable mount, wherein the engaging means comprises retention pockets formed in the horizontally planer distal end surfaces of the fixture arms so that the fixture is engageable with the flanged ends of the tension arms of the cable mount.

2. A fixture in accordance with claim 1, wherein the retention pockets situated on the distal ends of the fixture arms are spaced such that they are adapted to hold the cable mount in the second position.

3. A fixture in accordance with claim 1, wherein the fixture includes converging guide surfaces situated on opposing sides of the fixture arms and vertically disposed between the cable mount engaging means and the base member for guiding tool jaws of an automatic cable tie application tool into the space between the fixture arms.

4. A fixture in accordance with claim 3, wherein the fixture arms further comprise flat guide surfaces situated on their distal ends for guiding an end of the tension arms of the cable mount into the retention pockets.

5. A fixture in accordance with claim 4, wherein the fixture arms include an opposing indented distal area that provides additional space for spreading legs of the cable mount.

6. A fixture in accordance with claim 5, wherein the mounting means is two pairs of transversely extending guide slots for insertion of securing screws.

7. A fixture in accordance with claim 6, wherein the mounting means is a threaded aperture in the base for insertion of a securing screw.

8. A method of securing a cable tie to a cable mount by an automatic cable tie applicator tool comprising the steps of:

providing a cable mount having a resilient body member resiliently deformable from a first to a second position, and first and second mounting legs formed on and projecting from the body member such that deformation of the body member to the second position spaces the first and second legs further apart;

providing a harness fixture including a base member having mounting means for mounting the fixture to a harness board, and a pair of integral spaced apart fixture arms having engaging means situated on their distal ends for engaging the cable mount;

engaging the cable mount to the harness fixture so that the body member deforms to the second position;

situating a bundle of wires onto the cable mount;

positioning an automatic cable tie applicator tool into the space provided by the spaced apart fixture arms and between the mounting legs of the cable mount; and applying the cable tie to the cable mount and the bundle of wires.

* * * * *